United States Patent [19]

Andersen et al.

[11] Patent Number: 4,765,199

[45] Date of Patent: Aug. 23, 1988

[54] QUICK CONNECT CABLE COUPLER

[75] Inventors: Carl O. Andersen, Norristown; John E. Irvin, Collegeville; Gary W. Rhodenbaugh, Mont Clare, all of Pa.

[73] Assignee: Teleflex Incorporated, Limerick, Pa.

[21] Appl. No.: 6,789

[22] Filed: Jan. 27, 1987

[51] Int. Cl.$^4$ .............................................. F16C 1/10
[52] U.S. Cl. .................................. 74/501 D; 403/230; 285/322
[58] Field of Search .......... 74/501 R, 501 P, 501.5 R, 74/501.5 H, 502, 503, 496, 480 B; 403/290, 354, 313, 309; 285/322, 255

[56] References Cited

U.S. PATENT DOCUMENTS

| | | | |
|---|---|---|---|
| 1,601,976 | 10/1926 | Mayer | 74/502 |
| 2,112,722 | 3/1938 | Weber | 74/502 |
| 2,932,215 | 4/1960 | Crouse | 74/502 |
| 3,697,104 | 10/1972 | Soulie et al. | 403/290 |
| 3,766,801 | 10/1973 | Wiegand | 74/496 |
| 3,837,661 | 9/1974 | Phillippi | 403/290 |
| 3,908,977 | 9/1975 | Roepke et al. | 403/290 |
| 4,275,907 | 6/1981 | Hunt | 285/18 |
| 4,440,425 | 4/1984 | Pate et al. | 285/161 |
| 4,682,513 | 7/1987 | Reeder | 74/501 R |
| 4,705,303 | 11/1987 | Van Aspert | 285/322 |

FOREIGN PATENT DOCUMENTS

| | | | |
|---|---|---|---|
| 1201041 | 2/1986 | Canada | 74/501 R |
| 2450835 | 5/1976 | Fed. Rep. of Germany | 74/502 |
| 537039 | 6/1941 | United Kingdom | 74/502 |
| 2162273 | 1/1986 | United Kingdom | 74/501 R |

*Primary Examiner*—Gary L. Smith
*Assistant Examiner*—Vinh Luong
*Attorney, Agent, or Firm*—Reising, Ethington, Barnard, Perry & Milton

[57] ABSTRACT

A motion transmitting remote control assembly (10) of the type for transmitting forces along a curved path by a motion transmitting core element (14) including a conduit (12) supporting the core element (14). The conduit (12) has a female member (20) securely attached thereto. The female member (20) includes a plurality of flexible fingers (24) for disposition about a male member (18) which is secured to a support housing (16). The female member includes a rounded front cam portion (38) for engaging the male member and opening the fingers in response to the male member (18) being inserted into or removed from the female member (20). A locking ring (30) is included to move between an unlocked position and a locked position. When in the locked position, the fingers (24) of the female member (20) can not radially expand and are prevented from being removed from the male member (18).

5 Claims, 1 Drawing Sheet

QUICK CONNECT CABLE COUPLER

TECHNICAL FIELD

The present invention relates to remote control assemblies of the type for transmitting forces along a curved path by a flexible transmitting core element.

BACKGROUND ART

In current marine steering systems, a flexible conduit is attached to a steering helm. This attachment is made by turning a steering wheel and rotating a flexible helical core while inserting the core into a helm spigot. The internal wheel coacting with the core is then turned until the ferrule face at the end of the conduit meets the helm spigot face. A threaded connector nut, which is moveably mounted on the conduit, is threaded onto a threaded portion of the helm spigot and torqued into place using a wrench.

A plastic locking ring or washer is typically inserted in the connector nut as an anti-vibration loosening device. This requires a high torque to fully tighten the connector nut. In some instances, the connector nut is prohibited from being tightened all the way, introducing a space between the ferrule face and the spigot face, resulting in backlash or lost motion in the steering mechanism.

The U.S. Pat. No. 4,275,907 to Hunt, issued May 16, 1978, discloses a quick connecting type coupling for pipes. The coupling includes a female member including a plurality of resilient fingers for sliding over and mating with a male member. The male member is inserted into the female member and a locking ring is manually moved to a locked position to complete the coupling and prevent relative movement between the male and female members.

The U.S. Pat. No. 4,440,425 to Pate et al issued Apr. 3, 1984, discloses a flexible conduit system, having a similar female connector as that in the Hunt U.S. Pat. No. 4,275,907. The female member of the Pate et al patent adds a plurality of circumferentially spaced shoulders to keep the outer locking ring from sliding therepast once the ring has been placed in the locked position.

The U.S. Pat. No. 4,238,974 to Fawcett issued Dec. 16, 1980, discloses a ball and socket joint for push-pull cable terminals. In the U.S. Pat. No. 4,238,974 assembly, a male member is inserted in a female member to complete the connection.

STATEMENT OF THE INVENTION AND ADVANTAGES

According to the present invention, there is provided a remote control assembly of the type for transmitting forces along a curved path by a motion transmitting core element. The assembly comprises a flexible conduit having first and second ends, and a flexible motion transmitting core element. The core element is supported for movement in the conduit and has ends extending from the ends of the conduit. Attachment means is further provided for connecting the first end of the conduit to a support housing which receives the end of the core element. The attachment means includes a male member for connection to the support housing, and a flexible female member. The female member includes a plurality of slots defining flexible fingers movable between an expanded position for disposition about the male member and a contracted position for axial locking engagement with the male members. The female member further includes locking means movably disposed on the female member for movement between an unlocked position allowing radial expansion of the fingers to the expanded position and a locked position or preventing the radial movement of the fingers in the contracted position. The female member is characterized by a rounded front cam portion for engaging the male member and opening the fingers in response to the male member being inserted into or removed from the female member.

Accordingly, there is provided an attachment means for positively connecting a flexible conduit with a fitting such as a helm spigot. This connection with the cam portion facilitating assembly and disassembly prevents a space from forming between the male member and the female member, thus eliminating backlash or lost motion in the assembly.

FIGURES IN THE DRAWINGS

Other advantages of the present invention will be readily appreciated as the same becomes better understood when taken in reference to the accompanying drawings wherein.

DETAILED DESCRIPTION OF THE DRAWINGS

A remote control assembly of the type for transmitting forces along a curved path is generally shown at 10.

The assembly 10 includes a flexible conduit 12. The conduit 12 has first and second ends. The assembly 10 further includes a flexible motion transmitting core element 14 supported for movement within the conduit 12. The core element 14 has ends extending from the ends of the conduit 12. The core element 14 normally moves longitudinally within the conduit 12. The core element 14 is of the type having an inner braided core wrapped with a helical wire in spaced convolutions to define teeth for engaging female teeth in the circumference of a wheel supported in a housing 16. Such an assembly is shown in U.S. Pat. No. 3,766,801.

Figure 1:
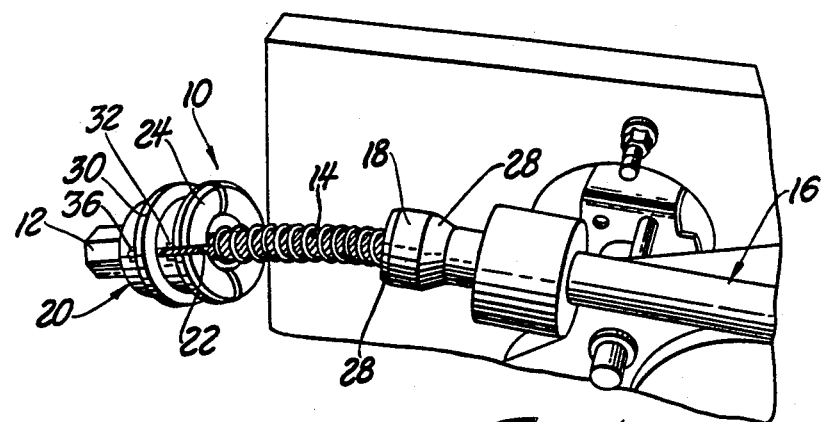
FIG. 1 is a perspective view of an assembly made in accordance with the present invention.

The assembly 10 further includes the support housing generally indicated at 16. The support housing 16, for example, may comprise a helm having a spigot as shown in FIG. 1 such as that commonly used in marine steering systems. The assembly 10 further includes attachment means for connecting the first end of the conduit 12 with the support housing 16. The support housing 16 receives the end of the core element 14. The attachment means includes a male member 18 for connection to the support housing 16. The attachment means further includes a flexible female member generally indicated at 20. The female member includes a plurality of slots 22 defining flexible fingers 24 moveable between an expanded position for disposition about the male member 18, and a contracted position for locking engagement with the male member 18. The female member 20 is made of plastic.

The female member 20 further defines a cavity 26 for receiving the conduit 12 to fixedly attach the female member 20 thereto. The conduit 12 is inserted sufficiently into the female member 20 and the end of the conduit 12 is peened into the cavity 26. In this manner of connection, the female member 20 is fixed to the conduit 12 and cannot slide relative to the conduit 12.

Figure 2:
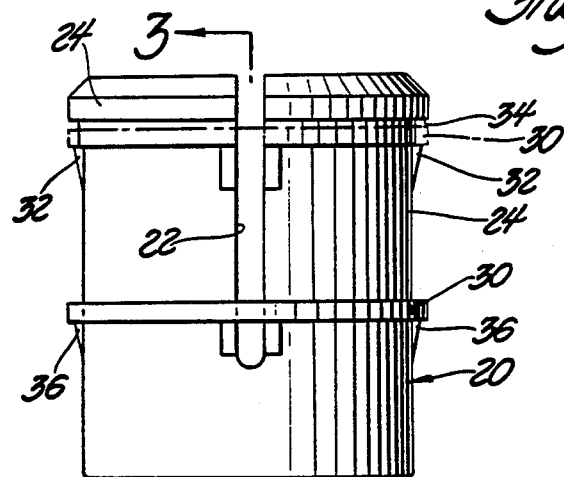
FIG. 2 is a side view of the female member of the present invention.
Figure 3:
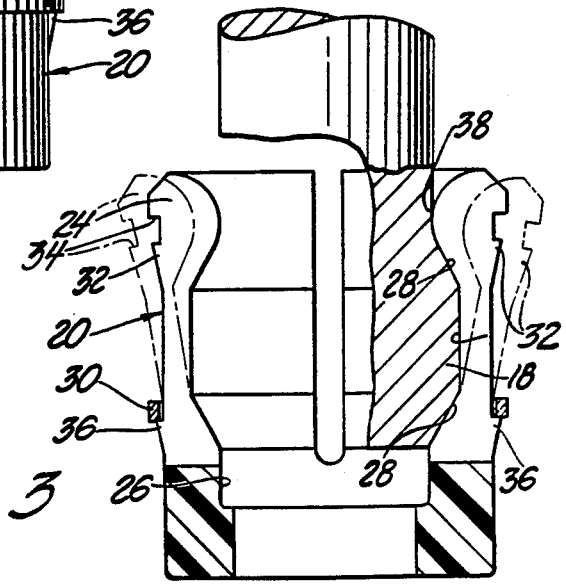
FIG. 3 is cross-sectional view taken substantially along line 3-3 of FIG. 2 and showing the male member cut away and in cross-section

The assembly 10 includes locking means movably disposed on the female member 20 for movement between an unlocked position and a locked position. The locking means includes a locking ring 30 on the exterior of the female member 20 for moving between a locked position as shown in phantom in FIG. 2 and an unlocked position as shown in solid lines in FIG. 2. In the unlocked position, the fingers can radially expand to the expanded position. In the locked position, the fingers 24 are prevented from expanding radially and are locked in the contracted position.

The assembly 10 further includes a plurality of circumferentially spaced ramps 32 on the exterior of the female member 20 to hold the locking ring 30 in the locked position by preventing the locking ring 30 from normally moving therepast. The locking ring 30 can be manually moved over the ramps 32 to place the ring 30 in the locked position. In normal use the ring 30 can not slide back over the ramps 32 from the locked position but due to the give in the plastic of the fingers 24 and the ramps 32, the ring 30 can be forced back over the ramps 32 to the unlocked position. The ring 30 can be removed from the locked position by manually moving the ring 30 past the ramps 32. The female member 20 further includes on the exterior thereof an annular front shoulder 34 for preventing the locking ring 30 from moving therepast when in the locked position.

The male member 18 is integral with the housing 16 and has an exterior surface including a pair of axially spaced frustoconical portion 28. The tapered portions 28 are for engaging the interior 40 of the female member 20 and prevent the male member 18 from moving axially relative to the female member 20 in the locked position.

The interior surface 40 of the female member 20 matches the exterior surface of the male member 18. This allows the female member 20 to mate with the male member 18 in the locked position and prevent relative axial motion between the female member 20 and the male member 18. This eliminates backlash or lost motion in the system.

The female member 20 further has a rounded front cam portion 38. The front cam portion 38 is for engaging the male member 18 upon insertion of the male member 18 into or removal of the male member 18 from the female member 20. The male member 18 engages the rounded front cam portion 38 and opens the fingers 24 in response to the male member 18 being inserted into or removed from the female member 20.

The rounded cam surface 38 eliminates the need to manually open the fingers 24 of the female member 20 to the expanded position and allows easy insertion of the male member 18 into the female member 20. Further, the surface 28 coacts with the cam portion 38 of the female member 20 and allows the female member 20 to be removed from the male member 18 without manually opening the fingers 24. The cam surface 38 engages the male member 18 in response to the male member 18 being removed from the female member 20 and opens the fingers 24 to the expanded position.

The female member 20 further includes stop means for abutting the locking ring 30 when the assembly is in the unlocked position. The stop means comprises a plurality of circumferentially spaced projections 36. These projections 36 are located on the exterior of the female member 20.

By way of example, the connection of the male member 18 and the female member 20 will be discussed in reference to the connection of a marine steering system as shown in FIG. 1. The core element 14 must first be inserted into the support housing 16 which comprises a helm spigot. The spigot end contains the male member 18 which is to be connected to the female member 20. The marine steering wheel (not shown) is turned and the female member 20 attached to the conduit 12 is forced over the male member 18. As the male member 18 contacts the female member 20, the male member 18 engages the rounded front cam portion 38 and opens the flexible fingers 24 to the expanded position. The female member 20 is then sufficiently forced over the male member 18 so that the exterior of the male member 18 is in mating engagement with the interior 40 of the female member 20 and the fingers 24 are in the contracted position. The locking ring 30 is then moved from the unlocked position, manually over the ramps 32 to the locked position to lock the fingers 24 in the contracted position. In the locked position, the locking ring 30 is prevented from being moved by the plurality of circumferentially spaced ramps 32 and by the annular front shoulder 34. The male member 18 can be removed from the female member 20 simply by manually moving the locking ring 30 from the locked position to the unlocked position. The male member will engage the cam portion 28 of the female member 20 and cause the fingers 24 to move to the expanded position. This allows the male member 18 to be removed from the female member 20. Once in the unlocked position, the locking ring 30 engages the plurality of projections 36. Also, in the unlocked position, the locking ring 30 is free to move between projections 36 and 32. Once the ring 30 is moved past the projection 32 it is locked and not free to move.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A remote control assembly (10) of the type for transmitting forces along a curved path by a motion transmitting core element (14) comprising:

a flexible conduit (12);

a flexible motion transmitting core element (14) supported for movement in said conduit;

attachment means for connecting said conduit (12) to a support housing (16) which receives said core element (14), said attachment means including a male member (18) for connection to the support housing (16) and a flexible female member (20);

said female member (20) including a plurality of slots (22) defining flexible fingers (24) for movement between an expanded position for disposition about said male member (18) and a smaller contracted position for axial locking engagement with said male member (18), a front cam portion (38) to engage said male member (18) and for opening said fingers (24) in response to said male member (18) being inserted into or removed from said female member (20), locking means including a locking ring (30) moveably disposed on said female member (20) for movement between an unlocked position allowing radial expansion of said fingers (24) to said expanded position and a locked position for preventing said radial movement of said fingers (24) in said contracted position and an annular front shoulder (34) for preventing said locking ring (30) from moving therepast when in said locked position, a plurality of circumferentially spaced ramps (32) on the exterior thereof and being spaced apart from said front shoulder (34) by a plurality of circumferentially spaced grooves, and stop means comprising a plurality of circumferentially spaced projections (36) on the exterior thereof and spaced axially from said ramps (32) for abutting said locking ring (30) when in said unlocked position.

2. An assembly as set forth in claim 1 further characterized by said female member (20) defining a cavity (26) therein for receiving said conduit (12) to fixedly attach said conduit (12) therein.

3. An assembly as set forth in claim 1 further characterized by said front cam portion being rounded for engaging said male member and for opening said fingers (24) in response to said male member (18) being inserted into or removed from said female member (20).

4. An assembly as set forth in claim 3 further characterized by said male member (18) having an exterior surface including a pair of axially spaced annular shoulders (28) for engaging the interior (40) of said female member (20) and preventing said male member (18) from sliding axially relative to said female member (20) in said locked position.

5. An assembly as set forth in claim 4 further characterized by said interior surface (40) of said female member (20) matching said exterior surface of said male member (18).

* * * * *